Inventors:
Kuno Radius
Julius Geier
By: Spencer & Kaye
Attorneys

Inventors:
Kuno Radius
Julius Geier
By: Spencer & Kaye
Attorneys

United States Patent Office 3,413,420
Patented Nov. 26, 1968

3,413,420
TELEPHONE SYSTEM HAVING HIGH-PRIORITY AND LOW-PRIORITY STATIONS

Kuno Radius and Julius Geier, Backnang, Wurttemberg, Germany, assignors to Telefunken Patentverwertungs-G.m.b.H., Ulm (Danube), Germany
Filed Apr. 14, 1965, Ser. No. 448,160
Claims priority, application Germany, Apr. 14, 1964, T 26,009; June 26, 1964, T 26,449
14 Claims. (Cl. 179—18)

ABSTRACT OF THE DISCLOSURE

A telecommunication system having both high-priority and low-priority stations, wherein the users of busy stations are apprised of the percentage of full capacity at which the system as a whole is operating and wherein, after the system has reached a predetermined percentage of full capacity, new calls may be originated only from the high-priority stations.

The present invention relates to an electric circuit, and, more particularly, to a circuit for flattening the traffic peaks in telecommunication systems, e.g., telephone systems, especially in the case of subsidiary or local, so-called private branch exchanges. These traffic peaks are flattened in that a special reference signal is produced which is applied to the extensions which are in use and by blocking new calls of certain groups of extensions when the system comes close to being saturated.

Central telephone exchanges incorporate a large number of devices which coact with each other in order to establish the various connections. These devices can be considered as falling into different groups, each group containing a certain class of devices. The maximum number of connections which the exchange can thus establish is determined by that particular group of devices which incorporates the smallest number of individual devices as compared to the other groups, each connection however requiring one of the devices of this smallest group. In the case of indirectly controlled connections, these devices are usually the so-called connecting links, or connector devices. It will thus be seen that there must be a sufficient number of such devices to handle the load during peak periods, even though they are used but little during the low-volume traffic periods.

There exist systems which monitor the traffic load by periodically testing the connection-establishing means, at predetermined time intervals, as to whether these means are busy or not, and which count and register the number of busy connections.

While in the case of a telephone exchange, an abundant number of connection-establishing means must be provided in order to avoid loss of revenue and/or extended waiting periods, private branch exchanges, and especially military switchboard installations, may be so designed that during peak periods, new connections can be established with certain designated ones of the various extensions. These will hereinafter be referred to as "high-priority" extensions, as opposed to the "low-priority" extensions.

There exist various types of automatic switching circuits, as, for example, circuits which connect a subscriber who has dialed a certain number, with a recorded announcement giving the time of day or the weather, or for connecting a subscriber who has dialed a number that is no longer in use with a suitable advisory service. Such circuits, however, do not provide any way in which the telephone user is apprised of the fact that the system as a whole, as, for example, the private branch exchange, is about to reach its full capacity, or in which, when the exchange comes close to being utilized to full capacity, there is any way to limit the originating of new calls to the designated high-priority telephones or extensions.

It is, therefore, the primary object of the present invention to provide a system which is capable of accomplishing the above results, namely, a system in which the persons speaking on the telephones will be apprised of the fact that the system is close to reaching its capacity limit, and in which the low-priority extensions will, during near-peak traffic conditions, be prevented from originating new calls, the right to originate such new calls being reserved to the high-priority extensions.

With the above objects in view, the present invention resides, basically, in a telecommunication system which includes a number of communicating stations, including both high-priority and low-priority stations, and a lesser number of connector devices, each being a means for establishing a communication channel between one of the communicating stations of the system and an external communicating station, so that the telecommunication system has the capacity to provide as many communication channels as there are connector devices. Means are provided for determining the number of busy connector devices and for producing different signals depending on the percentage of full capacity at which the system as a whole is operating, and means are also provided which respond to the signals put out by the determining means for producing indications that apprise the users of the busy communicating stations of the percentage of full capacity at which the system as a whole is operating and also for preventing the originating of new communication channels from the low-priority communication stations of the system when the system has reached a predetermined percentage of full capacity. In this way, new calls may thereafter be originated only from the high-priority stations.

The invention is particularly applicable in a telephone communication system, especially a smaller system such as a private branch exchange.

Additional objects and advantages of the present invention will become apparent upon consideration of the following description when taken in conjunction with the accompanying drawings in which.

Figure 1:
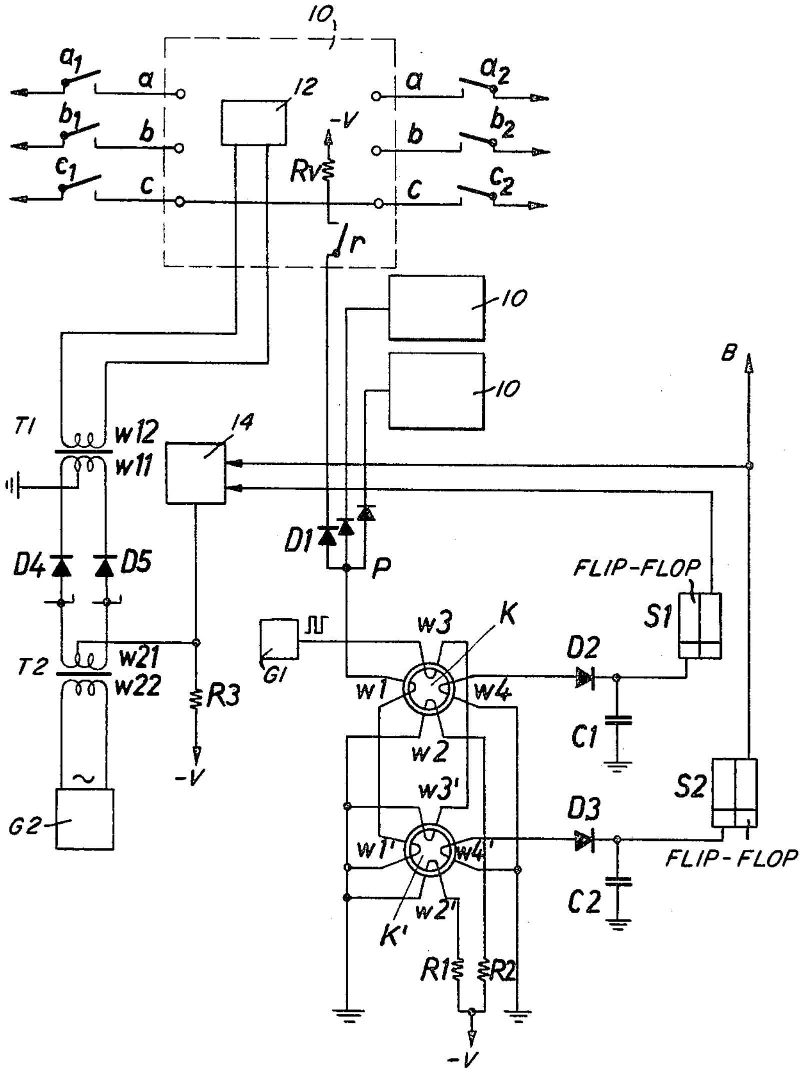
FIGURE 1 is a block diagram of a telecommunication system according to the present invention.

Referring now to the drawings, FIGURE 1 thereof shows a system according to the present invention in which, for purposes of determining the state of busyness of the system, the state of busyness of the connector links—of which several are shown symbolically, one of them in some detail, at 10—is utilized, each connector device having two voice communication, or audio lines *a*, *b*, and a control line *c*. The remaining connection-establishing means are indicated by the switches $a_1$, $b_1$, $c_1$ and $a_2$, $b_2$, $c_2$. FIGURE 1 shows two processing stages for determining the business of the system. The first stage becomes effective as soon as a predetermined number of connector links are busy and the second stage becomes effective as soon as a higher number of busy connector links have become busy.

The information signal which is to apprise the users of the busy extensions of the near-limit condition of the system consists of A.C. pulses of such frequency as to produce a tone which will not be missed during the telephone conversation. These pulses are put out at a slow rate by the first stage and at a high rate by the second stage, and are coupled, in each connector device, to the wires *a, b,* of of the two connected-together telephones, either by means of a switch 12 at the exchange or by means of an additional winding on the local line transformer.

When the connector device 10 is free, its control line *c* is at a potential —V, which is the potential that identifies this free state and which is applied via a resistor R*v*. When the device 10 is busy, however, this potential is shunted via the closed switch *r* and a rectifier D1 to the multiple point P. This point P is connected to the identifying potential via the windings *w*1 and *w*1′ of ring-shaped magnetic cores K and K′, which have well-defined hysteresis loops. Since all of the busy connector devices shunt the potential —V of their respective control wires via rectifiers D1 to the point P, there will flow through the windings *w*1 and *w*1′ a current which is proportional to the number of busy connector devices. The magnetic cores K and K′, however, have applied to them a magnetic bias which is opposed to the magnetization produced by the currents through the windings *w*1 and *w*1′, this magnetic bias being produced by currents flowing through the windings *w*2 and *w*2′. The amplitude of the biassing current is so adjusted, by means of the resistors R1 and R2, that the pulse generator G1 which is connected to the windings *w*3 and *w*3′ can change the magnetization of the cores K and K′ only when the excitation due to the windings *w*1 and *w*1′ has reached a certain predetermined value. If, then, the magnetic biassing currents flowing through the windings *w*2 and *w*2′ are adjusted to be different from each other, the currents flowing through the windings *w*1 and *w*1′ will result in different threshold values at which the magnetization direction, under the influence of the generator G, changes back and forth, so that the core K will change its direction of magnetization when a certain number of connecto devices are busy, while the other core K′ will change its direction of magnetization when a different, higher number of connector devices are busy.

The pulse generator G1 may be constituted by an astable multivibrator. When the direction of magnetization of the respective core changes, an A.C. voltage is induced in the readout windings *w*4, *w*4′, which is applied via a respective rectifier circuit comprising a rectifier and smoothing capacitor D2, C1; D3, C2, to a respective flip-flop S1, S2, and causes the same to change its state. The flip-flops S1, S2, in turn, have their outputs applied to time switch 14 which controls the generation of the information signal.

It will thus be seen that the circuit described above serves as a two-stage means for determining the number of busy connector devices and for producing different signals, depending on the percentage of full capacity at which the system as a whole is operating.

Each connector device 10 has associated with it a gate circuit comprising rectifiers D4, D5, and a transformer T1, which itself may be part of the exchange switch 12. The center tap of the winding *w*11 of the transformer T1 is connected with the reference potential. FIGURE 1 also shows a second transformer T2 whose primary winding *w*22 is connected across a tone generator G2 and which feeds the gate circuits of all of the connecting links. The secondary winding *w*21 of the transformer T2 has a center tap connected via resistor R3 to the potential —V, so that all of the rectifier paths D4, D5, are blocked simultaneously. As a result, the communication channels which are established by means of the connector devices will not be affected.

The time switch 14 is put in operation by the actuation of one or both of the flip-flops S1, S2, whereupon it replaces, for so long as it is activated, at the slow or the fast rate, depending on which of the two flip-flops S1, S2, has been actuated, the negative potential of the center tap of the winding *w*21 by a positive potential, so that the rectifier paths D4, D5, of all of the connector devices 10 become conductive and the audio-frequency pulses are applied to the exchange switches 12. These pulses, which have the same pulse widths, are applied via the audio lines *a, b,* to all of the telephones which are in use; the pulses coming at the slower rate produce a low tone and the pulses coming at the high rate produce a higher tone, the former serving as a request to the persons using the telephones to terminate their conversations as early as practicable and the latter serving as a request that at least non-essential or low-priority conversations be terminated immediately.

FIGURE 1 also shows that a signal may be derived from the flip-flop S2, at point B, to block calls involving the low-priority telephones.

The extent to which the individual telephones have access to the telephone network will depend on the particular priority assigned to the telephone. The priority designation of each respective telephone will be taken from that portion of the network assigned to each telephone. Each telephone extension is provided with a supply current circuit, whose potential changes when the telephone is busy. This change of potential is picked up and processed, via gate circuits and control pulses occurring at various instants, for recognizing and identifying the busy lines. When the telephone network has reached the state of business where the flip-flop S2 responds, the gate circuits of the low-priority telephones are connected with a separate circuit to which the potential of the point B is applied as a blocking potential, so that when the hand-set of one of these low-priority telephones is taken off, the change of potential of the supply current which this brings about will not be processed. The call sought to be made by this-priority telephone will thus not be put through, and this condition will remain in effect so long as the telephone system as a whole is so busy as to maintain the flip-flop S2 in its activated state.

Figure 2:
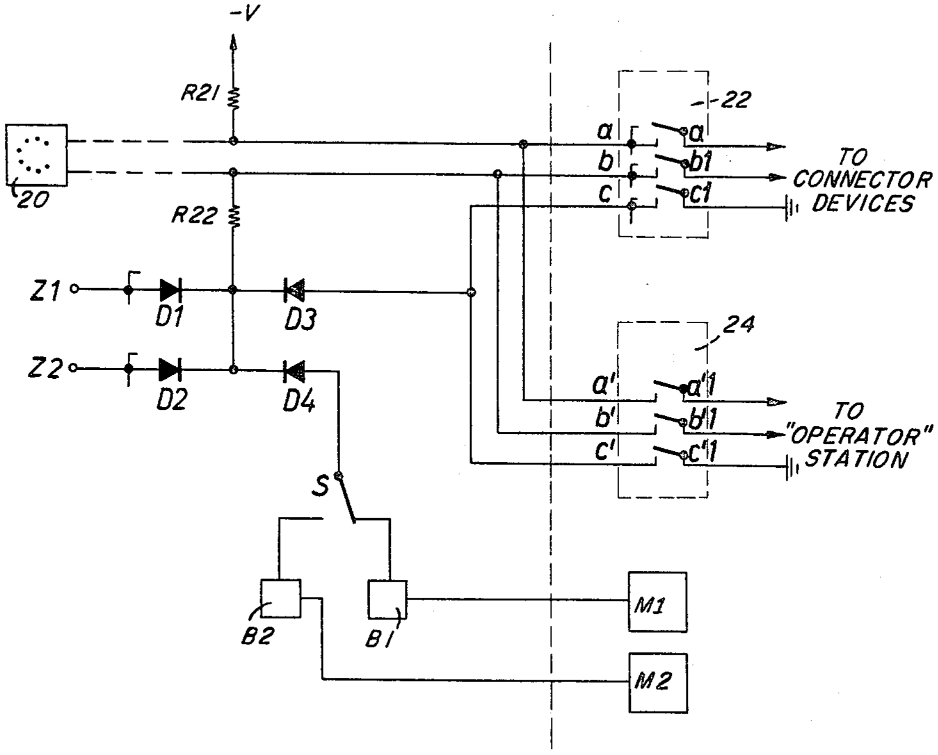
FIGURE 2 is a block diagram showing how a high-priority communication station of the system, such as a telephone extension, may continue to be able to originate new calls, even though low-priority telephone extensions have been cut off.

FIGURE 2 shows the connection of a telephone 20 which is to remain usable even though the exchange approaches its full capacity, i.e., a high-priority telephone which is to continue to be able to make outgoing calls at a time when the low-priority telephones are cut off.

Each extension line is, as usual, connected with the supply current circuit, the same comprising the voltage source —V and the supply resistors R21, R22, which are connected to the lines *a, b*. Thus when the extension is in use, the potential of the current supply line changes. This change of potential is picked up and processed by means of control pulses appearing at different instants and applied to the terminals Z1, Z2, and causes the call processing unit B1 to respond. The latter causes a marker M1 to seek a free path via the board 22 to a connector device (not shown in FIGURE 2) and to switch through.

As the exchange becomes increasingly busy and begins to approach its full capacity, a blocking signal is generated, in the manner described above, this signal being used to deactivate the call processing unit B1, thereby preventing this unit from handling any further calls of the telephones which are connected to such unit. The unit B1 can be deactivated, for example, by means of a gate circuit in the form of a switch S which disconnects the unit B1.

In order that the high-priority telephones remain usable and able to originate calls, the switch S is connected so as not merely to disconnect the unit B1 but to connect an auxiliary call processing unit B2 to which only the high-priority telephones are connected. This auxiliary call processing unit causes an auxiliary marker M2 to seek a free path via the auxiliary board 24, so that the telephone 20—which, as set forth above, is one of the high-priority telephones—can originate calls via this auxiliary swtchboard. Ths switchboard may lead to an operator who may then, by means not shown here, enable the telephone 20 to place a call through one of the still free lines of the main board 22.

If desired, telephones of different priorities may be connected to different call processing units, i.e., each call processing unit will be that of a particular priority (e.g., high, medium or low), and all high-priority extensions will be connected to the high-priority call processing unit, all medium-priority extensions will be connected to the medium-priority call processing unit, and all low-priority extensions will be connected to the low-priority call processing unit. Each call processing unit will then be switched off, as and when the percentage of full capacity of the private branch exchange increases and reaches the point requiring interruption of progressively more extensions.

It will be understood that the above description of the present invention is susceptible to various modifications, changes and adaptations, and the same are intended to be comprehended within the meaning and range of equivalents of the appended claims. For example, the circuits shown in FIGURES 1 and 2 may be modified as to details in that, for instance, the means which determine the number of busy connecting devices may incorporate, instead of ring-shaped magnetic cores K and K′, components such as relays or electronic circuit.

What is claimed is:

1. In a telecommunication system, the combination which comprises:

(a) a number of communicating stations, including both high-priority and low-priority stations;

(b) a lesser number of connector devices, each being a means for establishing a communication channel between one of the communicating stations of the system and an external communicating station, in consequence of which the telecommunication system has the capacity to provide as many communication channels as there are connector devices;

(c) means for determining the number of busy connector devices and for producing different signals depending on the percentage of full capacity at which the system as a whole is operating; and (d) means connected to said determining means and responsive to the signals put out thereby for producing indications that apprise the users of the busy communicating stations of the percentage of full capacity at which the system as a whole is operating and also for preventing the originating of new communication channels from said low-priority communicating stations of the system when the system has reached a predetermined percentage of full capacity, in consequence of which new calls may thereafter be originated only from said high-priority communicating stations.

2. A telecommunication system as defined in claim 1 wherein each of said stations is a telephone.

3. A telecommunication system as defined in claim 2 wherein each of said connector devices has audio lines and wherein said means (d) comprise means for applying audio signals to the audio lines of said connector devices, thereby audibly to apprise users of the telephones which are connected by each respective connector device.

4. A telecommunication system as defined in claim 3 wherein said means (d) form a two-stage unit and include means for generating a train of pulses of the same pulse width, means for putting out said pulses at a low rate when the system operates at a first predetermined percentage of full capacity, and means for putting out said pulses at a high rate when the system operates at a second predetermined percentage of full capacity which is higher than said first predetermined percentage.

5. A telecommunication system as defined in claim 2 wherein each of said connector devices has a control line which is at one potential when the respective device is busy and at another potential when the respective connector device is free, and wherein said means (c) are connected to the control lines of said connector devices.

6. A telecommunication system as defined in claim 4 wherein said means (c) comprise a plurality of controllable elements, eacsh presettable to a predetermined operating point representing a different predetermined percentage of full capacity of the system, each of said controllable elements being connected to said control lines of said connector devices.

7. A telecommunication system as defined in claim 6 wherein each of said control lines is a means for supplying a current when the respective connector device is busy, in consequence of which each of said controllable elements has applied to it a composite current which is the sum of all currents delivered by the control lines of all of the busy connector devices and which is therefore proportional to the number of busy connector devices.

8. A telecommunication system as defined in claim 7 wherein each of said controllable elements comprises a magnetic core, first winding means for applying to said core a magnetizing current which is a function of said composite current, second winding means for applying to said core a magnetic biassing current in opposition to said composite current, third winding means for applyng an audio-frequency signal to said core, and fourth winding means forming read-out means.

9. A telecommunication system as defined in claim 7 wherein said means (c) further comprise a plurality of flip-flops each connected to a respective one of said controllable elements, and wherein said means (d) are connected to the outputs of said flip-flops.

10. A telecommunication system as defined in claim 9 wherein said means (d) include a first component for producing audio signals of two different frequencies, depending on which of said flip-flops has been actuated by its respective control element, and a second component controlled by one of said flip-flops for cutting off low-priority telephones.

11. A telecommunication system as defined in claim 10 wherein said one flip-flop is the flip-flop associated with the controllable element which is preset to the higher predetermined percentage of full capacity of the system.

12. A telecommunication system as defined in claim 2 wherein each high-priority telephone has two output means, through one of which the respective high-priority telephone is prevented from originating a new communication channel and through the other of which such telephone is connectible to means for enabling a new communication channel to be established.

13. A telecommunication system as defined in claim 12 wherein said other output means of each respective high-priority telephone is connected to an "operator" station through whose facility the respective high-priority telephone may be enabled to originate a new communication channel through said one output means.

14. A telecommunication system as defined in claim 13 further comprising means which are effective upon activation of said means (d) for activating said other output means of each respective high-priority telephone.

References Cited

UNITED STATES PATENTS 2,385,061 9/1945 Clark ------------- 179—18.2

KATHLEEN H. CLAFFY, *Primary Examiner.*

A. H. GESS, *Assistant Examiner.*